Patented July 18, 1950

2,515,906

UNITED STATES PATENT OFFICE 2,515,906

BIS(HYDROXYPHENYL) COMPOUNDS

Donald R. Stevens, Wilkinsburg, and Arthur C. Dubbs, Springdale, Pa., assignors to Gulf Research & Development Company, Pittsburgh, Pa., a corporation of Delaware No Drawing. Application December 22, 1947, Serial No. 793,313

3 Claims. (Cl. 260—619)

This invention relates to addition agents for oils and more particularly it relates to new compounds represented by the following structural formula:

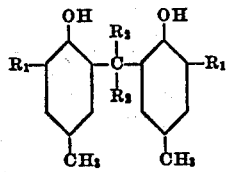

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups.

We have discovered that by condensing 2 moles of either o-secondary-butyl-paracresol or o-tertiary-butyl-paracresol and 1 mole of a ketone in the presence of a condensation catalyst such as anhydrous hydrogen chloride, we can produce compounds represented by the structural formula:

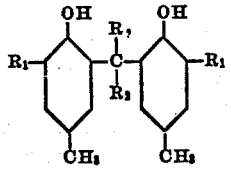

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. As examples of compounds falling within this class may be included 2,2-bis(2-hydroxy-3-t-butyl-5-methylphenyl)-propane; 2,2-bis(2-hydroxy-3-t-butyl-5-methylphenyl)butane; 2,2-bis(2-hydroxy-3-t-butyl-5-methylphenyl)-2-phenylethane; 3,3-bis(2-hydroxy-3-t-butyl-5-methylphenyl)-3-phenylpropane; bis(2-hydroxy-3-t-butyl-5-methylphenyl)-diphenylmethane; bis(2-hydroxy-3-t-butyl-5-methylphenyl)-di-4-methylphenylmethane; 2,2-bis(2-hydroxy-3-t-butyl-5-methylphenyl)-1,3-diphenylpropane; 2,2-bis(2-hydroxy-3-sec-butyl-5-methylphenyl)propane; 2,2-bis(2-hydroxy-3-sec-butyl-5-methylphenyl)butane; 2,2-bis(2-hydroxy-3-sec-butyl-5-methylphenyl)-2-phenylethane; 3,3-bis(2-hydroxy-3-sec-butyl-5-methylphenyl)-3-phenylpropane; bis(2-hydroxy-3-sec-butyl-5-methylphenyl)-diphenylmethane; bis(2-hydroxy-3-sec-butyl-5-methylphenyl)-di-4-methylphenylmethane; 2,2-bis(2-hydroxy-3-sec-butyl-5-methylphenyl)-1,3-diphenylpropane; and the like. We have found that compounds of the above type possess antioxidant properties, are soluble in oil, and are insoluble in water and in dilute aqueous alkali solutions. This combination of properties makes the compounds of our invention valuable for use as antioxidants in stabilizing various organic substances such as motor fuels, lubricating oils, turbine oils, transformer oils, and the like, when added thereto in relatively small amounts. Their insolubility in water makes them particularly advantageous for stabilizing gasolines and oils which, either in storage or in treatment, come in contact with water. Their insolubility in dilute aqueous alkali solutions permits their addition to gasolines prior to the usual alkali washing and doctor sweetening step encountered in refining operations. In addition to their antioxidant properties, the new compounds of our invention may be employed alone or in combination with filling materials as the basis of pressed articles, as binding agents or for preparing varnishes and other coating or impregnating agents. They are further useful as wax substitutes, or blending agents in the manufacture of various polishing agents such as shoe polish, floor polish, furniture polish, and the like. They may also be used as plasticizers, tackifiers, and insecticides.

Relative to their use an antioxidants, we have found that the addition of from about 0.005 to about 2 per cent by weight of compounds represented by the structural formula:

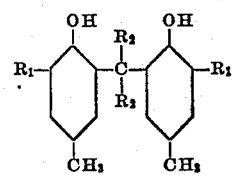

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups to an oil normally tending to undergo oxidational changes will substantially inhibit or greatly retard the formation of compounds which are corrosive to metals and will increase the oxidation stability of gasolines and other motor fuels. The exact amount of the compound used in any particular case will depend upon the nature of the base oil as well as the severity of the conditions to which it is subjected and also upon the particular additive chosen; in any case a small amount, sufficient to inhibit the oxidational changes normally tending to occur, is used.

In addition to a compound of the type disclosed herein, we may incorporate other "additive" agents in a lubricating oil including oiliness and extreme pressure agents, such as aromatic chlorine compounds, stabilized chlorinated paraffins, sulfurized fatty oils, and high molecular weight ketones and esters; viscosity index improvers, such as high molecular weight polymers of isobutylene and the polymers of methacrylic esters; pour point depressants, such as a condensation product of chlorinated wax and naphthalene and a condensation product of chlorinated wax and phenol followed by further condensation of this reaction product with organic acids; detergents, such as nickel naphthenate, metal salts of ethyl salicylate, and metal salts of alkyl substituted phenol sulfides; foam inhibitors, such as organo-silicon oxide condensation products, organo-silicol condensation products, and organo-germanium oxide condensation products; and other oxidation inhibitors, such as alkylated phenols, if desired.

The new compounds of our invention may be prepared by condensing either o-tertiary-butyl-paracresol or o-secondary-butyl-paracresol and a ketone in the presence of a condensation catalyst. The following are examples of a few of the ketones which may be used in accordance with our invention: acetone; methylethyl ketone; 1,3-diphenyl-2-propanone; propiophenone; 1-phenyl-2-propanone; 3,3-dimethyl-2-butanone; 3,3-diphenyl-2-butanone; 3-methyl-2-butanone; 1-phenyl-2-butanone; 4-phenyl-2-butanone; 2-pentanone; 3-methyl-2-pentanone; 4-methyl-2-pentanone; 2,2,4,4-tetramethyl-3-pentanone; 3-pentanone; 2,4-dimethyl-3-pentanone; 2-methyl-3-pentanone; 4,4'-dimethyl-2-pentanone; 2-hexanone; 5-methyl-2-hexanone; 3-hexanone; 5-methyl-3-hexanone; 2-heptanone; 3-heptanone; 6-methyl-3-heptanone; 4-heptanone; 2,6-dimethyl-4-heptanone; 2-methyl-4-heptanone; 2-octanone; 3-octanone; 2-nonanone; 3-nonanone; 5-nonanone; 2,8-dimethyl-5-nonanone; 2-decanone; 3-decanone; 4-decanone; benzophenone; 4,4'-dimethyl-benzophenone; acetophenone; 5-isopropyl-2-methyl-acetophenone; p-methyl-acetophenone; desoxybenzoin; propiophenone; butyrophenone; isobutyrophenone; and the like.

In carrying out the condensation reaction, the molecular ratio of the butyl-paracresol compound to the ketone compound is advantageously maintained at about 2:1. It may further be desirable in carrying out the reaction to dissolve the reactants in a common solvent such as glacial acetic acid. Water is formed in the course of the reaction, the reaction product separating out as a liquid or a solid. Where the reaction product is a liquid, the product may be found in the upper layer with the acetic acid on the bottom, or just the reverse may occur. It is therefore essential before discarding either layer, to determine which layer contains the product and which layer contains the acetic acid. The product is then separated from the acid layer and washed with water and/or aqueous sodium hydroxide. This washing removes any remaining acid condensation catalyst and also any remaining acetic acid. The washed product may then be purified by recrystallization from a suitable solvent or by fractionation.

As condensation catalysts, we may employ sulfuric acid, phosphoric acid, anhydrous aluminum chloride, boron trifluoride, boron fluoride complexes, ferric chloride, anhydrous zinc chloride, hydrogen chloride activated clays such as acid treated fuller's earth, bentonite, floridin, and the like. The amount of the condensing agent required may be as little as 1 per cent based on the total weight of the reactants. However, larger amounts, as high as 20 per cent by weight, may also be employed. More than about 10 per cent of the condensation catalyst is not ordinarily necessary.

The condensation reaction is carried out at a temperature below about 100° C. and advantageously at a temperature within the range of from about 0° to about 50° to 55° C. We have found that if the temperature is allowed to exceed 100° C. for an extended period of time, undesirable side reactions may take place.

The following examples will illustrate the general method employed in preparing the compounds of our invention:

EXAMPLE I 2,2-bis(2-hydroxy-3-t-butyl-5-methylphenyl)-propane

Into a flask were placed 49.3 grams (0.3 mole) of o-t-butyl-paracresol, 8.7 grams (0.15 mole) of acetone, and 50 ml. of glacial acetic acid. The solution thus formed was cooled to between about 0° C. and about 10° C. in an ice bath, after which anhydrous hydrogen chloride was introduced slowly below the surface of the solution. The addition of hydrogen chloride was continued for 10 hours while maintaining the temperature of the reactants between about 0° and about 10° C. A white crystalline product precipitated out of solution. The white crystals were separated from the solution and recrystallized 3 times from a mixed solvent consisting of about 1 part of acetone and about 3 parts of ethyl alcohol. The purified white crystals thus obtained melted at 161° to 162° C. and were determined to be 2,2-bis(2-hydroxy-3-t-butyl-5-methylphenyl)propane.

| Ultimate Analysis | Found for Product | Calculated for 2,2-bis(2-hydroxy-3-t-butyl-5-methyl-phenyl)propane |
|---|---|---|
| Carbon | 82.00 | 81.47 |
| Hydrogen | 9.87 | 9.85 |
| Oxygen | 1 8.13 | 8.68 |

1 By difference.

EXAMPLE II 2,2-bis(2-hydroxy-3-t-butyl-5-methylphenyl)-butane

Into a flask were placed 59.1 grams (0.36 mole) of o-tertiary-butyl-paracresol, 13 grams (0.18 mole) of methylethyl ketone, 3 grams of anhydrous zinc chloride, and 15 mls. of glacial acetic acid. The solution thus formed was cooled to between about 0° and about 10° C. in an ice bath, after which anhydrous hydrogen chloride was introduced slowly below the surface of the solution. The addition of hydrogen chloride was continued for 10 hours while maintaining the temperature of the reactants between about 0° and about 10° C. A white crystalline product was separated from the reaction mass and recrystallized 3 times from a solvent mixture consisting of about 1 part of acetone and about 3 parts of ethyl alcohol. The purified white crystals thus obtained melted at 134.5° to 135.5° C. and were determined to be 2,2 - bis(2 - hydroxy-3-t-butyl-5-methylphenyl) - butane.

| Ultimate Analysis | Found for Product | Calculated for 2,2-bis(2-hydroxy-3-t-butyl-5-methyl-phenyl) butane |
|---|---|---|
| Carbon | 81.79 | 81.62 |
| Hydrogen | 10.14 | 10.01 |
| Oxygen | [1] 8.07 | 8.37 |

[1] By difference.

In order to illustrate the antioxidant properties of the compounds of our invention, 2,2-bis(2-hydroxy-3-t-butyl-5-methylphenyl) propane, prepared as described in Example 1, was added to a reference gasoline having an induction period of 59 minutes. The 2,2-bis(2-hydroxy-3-t-butyl-5-methylphenyl) propane was added to the gasoline in the proportion of about 0.0002 mole per 100 mls. of gasoline (0.074 gram per 100 mls.). The induction period of the inhibited gasoline increased to 94 minutes, which amounted to an increase of about 60 per cent over the induction period of the base gasoline.

While our invention has been described above with reference to various specific examples and embodiments, it will be understood that the invention is not limited to such illustrated examples and embodiments and may be variously practiced within the scope of the claims hereinafter made.

What we claim is:
1. A new compound having the following structural formula:

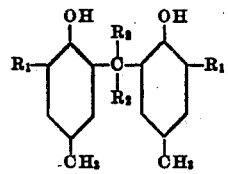

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups.

2. 2,2 - bis(2-hydroxy-3-t-butyl-5-methylphenyl) propane.

3. 2,2 - bis(2-hydroxy-3-t-butyl-5-methylphenyl) butane.

DONALD R. STEVENS.
ARTHUR C. DUBBS.

REFERENCES CITED

The following references are of record in the file of this patent:

UNITED STATES PATENTS

| Number | Name | Date |
|---|---|---|
| 1,961,397 | Schoeller et al. | June 5, 1934 |
| 2,295,985 | Baird et al. | Sept. 15, 1945 |